United States Patent

[11] 3,612,930

| [72] | Inventor | Virgil W. Raby<br>Dayton, Ohio |
|---|---|---|
| [21] | Appl. No. | 55,667 |
| [22] | Filed | July 17, 1970 |
| [45] | Patented | Oct. 12, 1971 |
| [73] | Assignee | General Motors Corporation<br>Detroit, Mich. |

[54] SALIENT FIELD POLE PIECE FOR DYNAMOELECTRIC MACHINES
2 Claims, 2 Drawing Figs.

| [52] | U.S. Cl. | 310/218, 310/269 |
|---|---|---|
| [51] | Int. Cl. | H02k 1/28 |
| [50] | Field of Search | 310/218, 217, 216, 269, 262, 261, 259 |

[56] References Cited
UNITED STATES PATENTS

| 792,607 | 3/1905 | McElroy | 310/218 |
|---|---|---|---|
| 2,852,711 | 9/1958 | Derner et al. | 310/269 |

FOREIGN PATENTS

| 422,711 | 1/1910 | France | 310/218 |
|---|---|---|---|

Primary Examiner—Milton O. Hirshfield
Assistant Examiner—B. A. Reynolds
Attorneys—E. W. Christen, C. R. Meland and Robert W. Smith

ABSTRACT: A salient field pole piece for a dynamoelectric machine is fastened in an interlocking joint to a magnetic core member by a series of removable pins which are clamped between an elongated bar and the magnetic core member. The elongated bar extends through a longitudinal slot provided in the pole piece and screws mounted in the elongated bar force the pins inwardly. The pole piece is pressed outward from the core member so that it is clamped along the interlocking joint.

PATENTED OCT 12 1971

3,612,930

INVENTOR
Virgil W. Raby
BY
Robert W. Smith
ATTORNEY

SALIENT FIELD POLE PIECE FOR DYNAMOELECTRIC MACHINES

This invention relates to a salient field pole piece for dynamoelectric machines and more particularly to a pole piece construction for fastening to a magnetic core member in a mutually interlocking relationship.

In certain types of dynamoelectric machines including direct current and synchronous alternator types, magnetic circuits are formed on either the stator or rotor assemblies with circumferentially disposed projecting or salient type field poles. These field poles are provided by salient pole pieces formed of stacks of laminations extending radially from a magnetic yoke or core member. Magnetic circuit paths between adjacent pole pieces are provided through the magnetic core members. Field winding coils are usually provided surrounding each of the pole pieces and are interconnected to develop desired magnetic flux fields through the pole pieces. The magnetic flux fields developed in the pole pieces are associated with a magnetic core member attached to either the stator or rotor assemblies so as to electrodynamically react with a magnetic flux filed associated with the other of the assemblies.

One of the chief problems in the construction and assembling of salient pole pieces is fastening of the pole pieces to the magnetic core members supporting them. In salient pole rotor assemblies of dynamolectric machines operated at high speeds, the salient pole pieces must be fastened so as to withstand high centrifugal forces. One known method of securing salient pole pieces employs bolts extending through the magnetic core member and threaded to the inner side of the pole piece or alternatively extending through the face of the pole piece and threaded to the magnetic core. The aforementioned bolting method is more often used for slower speed machines, whereas in salient pole rotors intended for high speed operation it is more common to attach the pole pieces in an interlocking or dovetail joint. In the latter method, a key is normally applied to a keyway slot extending along the joint for wedging the pole piece in place.

In accordance with the present invention, a salient field pole piece is constructed for mounting in a dovetail joint formed with a magnetic core member without the use of a wedge or key. A series of holes are provided which extend from the pole face through a dovetail projection on the opposite and inner side of the pole piece. A series of pins insertable through the pole face are provided in each of the holes. An elongated bar carried in a longitudinal slot formed across the holes carries a plurality of screws for compressively loading the series of pins so as to clamp the pole piece along the dovetailed joint.

It is an object of this invention to provide an improved salient field pole piece construction for forming a high strength interlocking joint mounting arrangement in which the pole piece is clamped along the joint by a longitudinally extending bar having a series of screws which are aligned with pins insertable from the pole face for compressively clamping the pins within the pole piece.

A further object of this invention is to provide a salient field pole piece including a dovetail projection for mounting in a complementary dovetail groove provided in the magnetic core of a salient pole rotor assembly in which the stack of laminations forming the body of the pole piece includes a longitudinal slot supporting an elongated bar and in which a series of holes extending through the face of the pole piece and through the longitudinal slot receive pins which are pressed against the bottom of the groove by screws threaded to the bar so as to facilitate assembling the pole piece in a manner that securely fastens the pole piece for high speed operation of the rotor assembly.

Further objects and advantages of the present invention will be apparent from the following description reference being had to the accompanying drawing wherein a preferred embodiment of the invention is clearly shown.

Figure 1:
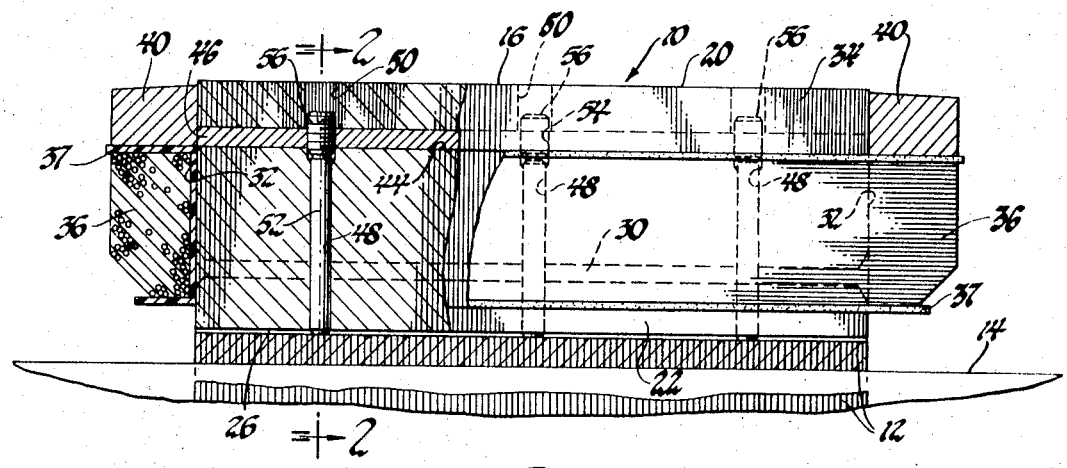
FIG. 1 is a longitudinal view of a salient field pole piece construction made in accordance with the present invention, the left hand portion being shown in section.

Referring now to the drawing, there is shown in FIG. 1 a portion of a dynamoelectric machine including a salient field pole piece 10 made in accordance with the present invention. The pole piece 10 is carried by a magnetic yoke or core member 12. The magnetic core member 12, in one preferred embodiment, is formed by a laminated spider part of a salient pole rotor assembly that is carried by a shaft 14 of a dynamoelectric machine. The spider forming the magnetic core member 12 is secured to the shaft 14 by means of a key and keyway, not shown.

It is to be understood that the magnetic core member 12 encircles the shaft 14 and that a circumferential series of pole pieces such as pole piece 10 project radially from the magnetic core member 12. A single pole piece 10 is illustrated in the drawing for the purposes of simplifying the drawing and description of this invention which follows hereinbelow.

Figure 2:
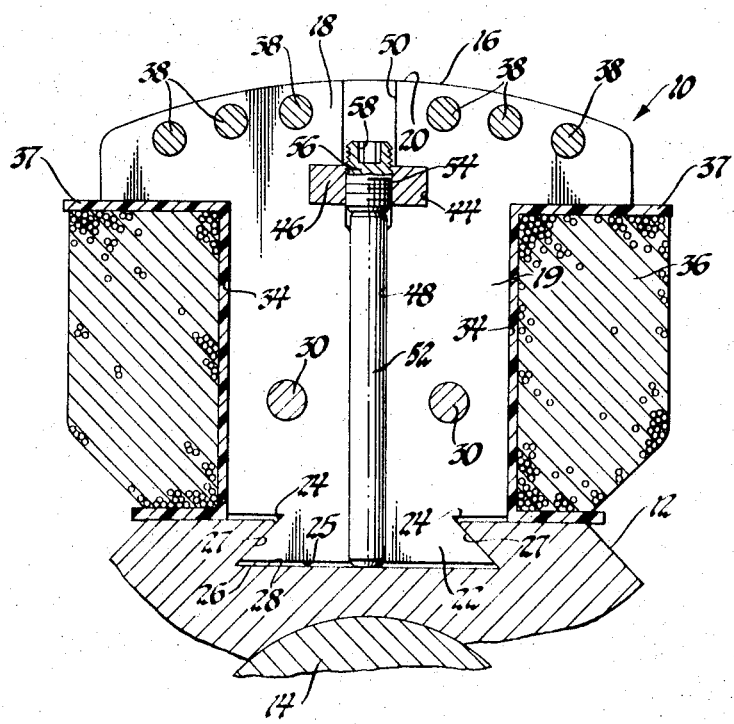
FIG. 2 is an enlarged cross-sectional view taken along the line 2—2 of FIG. 1.

A stack of laminations 16 forms the body of the pole piece 10 and is made from assembled punchings formed of thin sheets of a suitable magnetic iron material. The stack of laminations 16 includes a pole tip portion 18 on the outer side, illustrated in FIG. 2, providing a convex arcuate pole face 20. The lateral sides of the pole tip portion 18 extend from the outer portion of the center section 19 of the stack of laminations 16. The inner side of the center section 19, opposite the pole face 20, includes a dovetail projection 22 formed by diverging sides 24 terminating at a flat bottom side 25.

The dovetail projection 22 is mounted in a complementary dovetail groove 26 formed by diverging walls 27 extending from the surface of the magnetic core member 12 and terminating in a flat bottom wall 28. Accordingly, an interlocking joint is formed between the sides 24 of the dovetail projection 22 and the walls 27 of the groove 26.

The center portion 19 of the stack of laminations 16 between the pole tip portion 20 and dovetail projection 22 includes a series of holes receiving rivets 30 which clamp the axial ends 32 of the stack of laminations 16. The rivets 30 hold the punchings forming the stack of laminations 16 together in axial compression. The lateral sides 34 formed along the center portion 19 support a field winding coil 36 surrounding the stack 16. A layer of sheet insulation material 37 separates the coil 36 from the stack of laminations 16.

The pole tip portion 18 may include axial holes for carrying a series of damping or pole face windings formed by conductor rods 38 made of an electrically conductive material. The conductor rods 38 are interconnected at the ends by a pair of conductive end plates 40 suitably fastened to the ends 32 of the stack of laminations 16. The pair of conductive end plates 40 extend over the ends of the filed winding coil 36 and are also separated therefrom by the layer of insulation 37.

The punchings forming the stack of laminations 16 are formed with rectangular openings, in accordance with the present invention, and register with each other to form a longitudinally extending slot 44 generally located at the bottom of the pole tip portion 18 equidistant between the pair of lateral sides 34 of the center section 19. Thus, the longitudinal slot 44 has enclosed rectangular sides. An elongated metal bar 46 made of a high strength steel material and having a rectangular cross section complementary to the cross section of the longitudinal slot 44 is provided so as to have a close sliding fit when inserted therein. The ends of the elongated bar 46 terminate within the longitudinal slot 44 adjacent the ends 32 of the stack of laminations 16.

A series of longitudinally spaced pin receiving holes 48 are drilled into the pole face 20 through the center of the longitudinal slot 44 and the bottom side 25 of the dovetail projection 22. The holes 48 communicate with the longitudinal slot 44 and are substantially perpendicular thereto. The holes 48 are spaced substantially equally apart and from the axial ends 32 of the laminated stack 16. Three of the holes 48 are provided in the preferred embodiment illustrated in FIG. 1 although it is to be understood the number of the holes 48 may vary in accordance with the length of the stack of laminations 16 The ends of the holes 48 extending through the pole tip portion 18 are counterbored, as indicated by numeral 50, to provide an increased diameter opening from the pole face 20 to a location immediately below the longitudinal slot 44.

Cylindrical pins 52 are provided for insertion into the holes 48 and have a sliding fit therewith. The pins 52 are made of a high strength steel rod material and extend from the bottom side 25 of the dovetail projection 22 to the bottom of the counterbores 50 immediately below the elongated bar 46. Threaded holes 54 are provided in the elongated bar 46 so as to extend coaxially with the holes 48. The diameters of the threaded holes 54 are slightly larger than the diameter of the pins 52 and less than the counterbores 50 so that the pins 52 can be slipped through the counterbore 50, the threaded openings 54 and against the groove bottom wall 28. Setscrews 56 are mounted in the threaded openings 54 and engage the outer ends of the pins 52. The setscrews are provided with a recessed slot or socket 58 so that a tool may be inserted into the counterbore 50 to tighten the set screws so as to force the pins 52 against the groove bottom 28.

The compressive loading of the pins 52 exerts a reaction force on the inner ends of the set screws 56 which is transmitted to the elongated bar 46 so that it is pressed outwardly toward the pole face 20. This clamps the elongated bar 46 against the outer wall of the longitudinal slot 44. The dovetail projection 22 is then forced outwardly so that the diverging sides 24 are clamped against the diverging walls 27 of the dovetail groove 26. Accordingly, the pole piece 10 is securely and solidly clamped to the magnetic core member 12 by the clamping action of the elongated bar 46 against the upper wall of the longitudinal slot 44 and the forced interlocking engagement along the dovetail joint formed between the dovetail projection 22 and dovetail groove 26.

In assembling the pole 10 of this invention to the magnetic core member 12, the punchings of the laminated stack 16 are assembled so that the corresponding parts are in axial registration. Accordingly, the holes for receiving the damper windings 38, the rectangular holes for forming the longitudinal slot 44 and the holes for receiving the rivets 30 are aligned and the stack of laminations 16 is axially compressed. The series of rivets 30 are assembled while the stack of laminations 16 is compressed so as to maintain the axial compressed condition and secure the stack of laminations 16 as an integral part. The holes 48 are then drilled through the pole face 18 of the laminated stack 16 in alignment with the center of the longitudinal slot 44.

The layer of insulation 37 and the field winding coil 36 are mounted on the center portion 19 of the stack of laminations 16. The stack of laminations 16 is then mounted on the magnetic core member 12 by axially inserting the dovetail projection 22 through an end of the dovetail groove 26 and aligning the ends 32 with the ends of the dovetail groove 26. One end of the elongated bar 46 is axially inserted into the longitudinal slot 44 so that the threaded openings 54 are centered with the holes 48. The pins 52 are then placed through the counterbore 50 of each hole 48 and the threaded openings 54 of the elongated bar 46. The pins are then seated against the groove bottom wall 28 and within the holes 48 below the longitudinal slot 44. The set screws 56 are then threadably mounted to the threaded openings 54.

The conductor bars 38 are assembled to the stack of laminations 16 and the conductive end plates 40 are secured to the axial ends 32 adjacent the pole tip portions 18. The opposite ends of the conductor bars 38 are electrically interconnected by the conductive end plates 40 to complete the arrangement for the damping winding.

The final assembly step is to tighten the setscrews 56 by means of a tool applied to the socket 58 so that the pins 52 are compressively loaded. The reaction force on the inner ends of the setscrews 56 presses the elongated bar 46 outwardly against the outer wall of the slot 44 as described hereinabove. Accordingly, the dovetail projection 22 is clamped against the walls 27 of the dovetail groove 26 to thereby form a high strength interlocking joint connection between the pole piece 10 and the magnetic core member 12. This provides an integral magnetic field arrangement with the pole piece 10 capable of withstanding high centrifugal forces when the machine shaft 14 is rotated at high speeds.

While the embodiment of the invention as herein disclosed constitutes a preferred form, it is to be understood that other forms may be adopted.

What is claimed is as follows:

1. In combination, a salient field pole piece for a dynamoelectric machine, comprising: a magnetic core member including a groove formed by diverging walls extending the surface of said magnetic core member and terminating in a bottom wall for supporting said salient field pole piece; a stack of laminations forming the body of said pole piece and carrying a field winding coil, said stack of laminations including a pole tip portion and a projection disposed oppositely to said pole tip portion and formed by diverging sides and a bottom side respectively complementary to said diverging walls and said bottom wall of said groove for mounting said stack of laminations to said magnetic core within an interlocking joint; a longitudinal slot having enclosed sides extending axially between the ends of said stack of laminations; a series of longitudinally spaced holes extending through said pole tip portion and said projection of said stack of laminations and communicating with the center of said longitudinal slot; a plurality of pins insertable in said series of longitudinally spaced holes and extending between said longitudinal slot and said bottom side of said projection and an elongated bar insertable in said longitudinal slot and extending between the ends of said stack of laminations, said elongated bar including a series of threaded openings coaxially aligned with each of said series of longitudinally spaced holes and carrying screw members engaging the ends of said plurality of pins, said screw members compressively loading said plurality of pins when said screw members are tightened in said threaded openings thereby clamping said plurality of pins against said bottom wall of said groove, whereby said diverging sides of said projection are clamped against said diverging walls of said groove for high strength fastening of said salient field pole piece to said magnetic core member.

2. In combination, a salient field pole piece for a salient pole rotor of a dynamoelectric machine, comprising: a magnetic core member carried by the shaft of said dynamoelectric machine including a dovetail groove having diverging walls extending from the surface of said magnetic core member and terminating in a flat bottom wall for supporting said pole piece; a stack of laminations forming the body of said pole piece and carrying a field winding coil, said stack of laminations including an arcuate pole tip portion and a dovetail projection disposed oppositely to said pole tip portion and formed by diverging sides engaging said diverging walls of said dovetail groove and flat bottom side facing said flat bottom wall for mounting said laminated stack to said magnetic core along a mutually interlocking dovetail joint; a longitudinal slot having enclosed substantially rectangular sides extending axially between the ends of said pole tip portion of said stack of laminations; a series of longitudinally spaced holes extending through said pole tip portion and said dovetail projection and communicating with the center of said longitudinal slot, said longitudinally spaced holes including counterbored portions extending within said pole tip portion; a plurality of cylindrical pins slidingly fitting in said series of longitudinally spaced holes between said longitudinal slot and said bottom side of said dovetail projection; a rectangularly shaped elongated metal bar slidingly insertable in said longitudinal slot and extending between the ends of said stack of laminations and supported by said sides of said longitudinal slot, said elongated bar including a series of threaded openings coaxially aligned with each of said series of longitudinally spaced holes and having diameters larger than the diameters of said series of longitudinally spaced holes and less than the diameters of said counterbored portions; and a series of screws threadingly mounted in said threaded openings and compressively loading each of said plurality of cylindrical pins against said bottom wall of said dovetail groove whereby tightening of said series of screws presses said elongated bar against the outer side of said sides of said longitudinal slot and clamps said diverging sides of said dovetail projection against said diverging walls of said dovetail groove for securing said salient field pole piece in place on said magnetic core member.